(12) United States Patent
Zhan (10) Patent No.: US 12,072,079 B2
(45) Date of Patent: Aug. 27, 2024

(54) LAMP FOR LAPTOP

(71) Applicant: Qisda Corporation, Taoyuan (TW)

(72) Inventor: Min Han Zhan, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/403,678

(22) Filed: Jan. 3, 2024

(65) Prior Publication Data
US 2024/0247785 A1 Jul. 25, 2024

(30) Foreign Application Priority Data

Jan. 19, 2023 (TW) ................... 112102634

(51) Int. Cl.
*F21V 19/02* (2006.01)
*F21L 4/04* (2006.01)
(Continued)

(52) U.S. Cl.
CPC ................ *F21V 19/02* (2013.01); *F21L 4/04* (2013.01); *F21V 14/025* (2013.01); *F21V 15/04* (2013.01);
(Continued)

(58) Field of Classification Search
CPC .... F21S 6/006; F21V 21/088; F21V 21/0885; F21V 21/14; F21V 21/045; F21V 21/08;
(Continued)

(56) References Cited

U.S. PATENT DOCUMENTS 2,116,050 A * 5/1938 Hubert .................... F21V 21/26
174/86
5,993,022 A * 11/1999 Neyer ................. F21V 23/0414
362/199
(Continued)

FOREIGN PATENT DOCUMENTS

CN 110701520 A * 1/2020
CN 215987107 3/2022
(Continued)

OTHER PUBLICATIONS

Machine translation of CN 110701520 A retrieved from the FIT database of PE2E search. (Year: 2024).*
(Continued)

*Primary Examiner* — Colin J Cattanach (57) ABSTRACT

A lamp for a laptop includes a lamp arm, a base, and a lamp body. The lamp arm has a connecting element and a first electrical contact located at the connecting element. The base has a first rotating shaft portion fixedly connected to the connecting element. The lamp body includes a casing, a circuit board, a second electrical contact, and a flexible circuit board. The casing has a second rotating shaft portion adapted to rotate relative to the first rotating shaft portion. The circuit board is disposed in the casing. The second electrical contact passing through the first rotating shaft portion is configured to contact the first electrical contact. The flexible circuit board is electrically connected between the circuit board and the second electrical contact. When the
(Continued)

lamp body is rotated, the relative position of the second electrical contact and the first electrical contact is fixed.

10 Claims, 8 Drawing Sheets (51) Int. Cl.
*F21S 6/00* (2006.01)
*F21V 14/02* (2006.01)
*F21V 15/04* (2006.01)
*F21V 19/00* (2006.01)
*F21V 21/04* (2006.01)
*F21V 21/08* (2006.01)
*F21V 21/088* (2006.01)
*F21V 21/116* (2006.01)
*F21V 21/14* (2006.01)
*F21V 21/26* (2006.01)
*F21V 21/28* (2006.01)
*F21V 21/29* (2006.01)
*F21V 21/30* (2006.01)
*F21V 23/00* (2015.01)
*F21V 23/06* (2006.01)
*G06F 1/16* (2006.01)
*H01R 33/08* (2006.01)

(52) U.S. Cl.
CPC ............... *F21L 4/045* (2013.01); *F21S 6/006* (2013.01); *F21V 14/02* (2013.01); *F21V 19/008* (2013.01); *F21V 19/0085* (2013.01); *F21V 19/009* (2013.01); *F21V 21/045* (2013.01); *F21V 21/08* (2013.01); *F21V 21/088* (2013.01); *F21V 21/0885* (2013.01); *F21V 21/116* (2013.01); *F21V 21/14* (2013.01); *F21V 21/26* (2013.01); *F21V 21/28* (2013.01); *F21V 21/29* (2013.01); *F21V 21/30* (2013.01); *F21V 23/002* (2013.01); *F21V 23/06* (2013.01); *G06F 1/1607* (2013.01); *H01R 33/0854* (2013.01)

(58) Field of Classification Search
CPC ........ F21V 21/116; F21V 21/26; F21V 21/28; F21V 21/29; F21V 21/30; F21V 14/02; F21V 14/025; F21V 19/008; F21V 19/0085; F21V 19/009; F21V 23/002; F21V 23/06; F21L 4/04; F21L 4/045; H01R 33/0854
See application file for complete search history.

(56) References Cited

U.S. PATENT DOCUMENTS

| 2006/0256584 | A1* | 11/2006 | Paoluccio | F21S 2/005 |
| | | | | 362/652 |
| 2009/0190333 | A1* | 7/2009 | Sohn | A42B 1/244 |
| | | | | 362/106 |
| 2015/0117008 | A1* | 4/2015 | Chen | F21V 23/00 |
| | | | | 362/249.03 |

FOREIGN PATENT DOCUMENTS

| TW | 202219425 | 5/2022 |
| TW | M631230 | 8/2022 |

OTHER PUBLICATIONS

Xiaomi, "Mi Computer Monitor Light Bar, Product Model: MJGJD01YL", available at: https://www.mi.com/US/product/mi-computer-monitor-light-bar/.

* cited by examiner

FIG. 8B

LAMP FOR LAPTOP

CROSS-REFERENCE TO RELATED APPLICATION

This application claims the priority benefit of Taiwan application serial no. 112102634, filed on Jan. 19, 2023. The entirety of the above-mentioned patent application is hereby incorporated by reference herein and made a part of this specification.

BACKGROUND

Technical Field

The disclosure relates to a lamp, and in particular to a lamp for a laptop.

Description of Related Art

Figure 1:
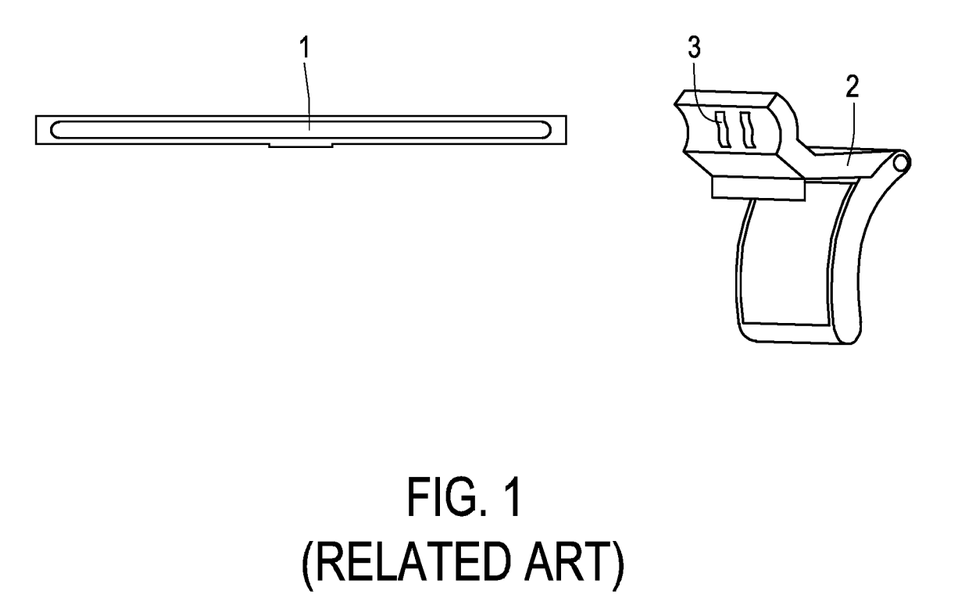
FIG. 1 is a schematic diagram of a conventional lamp for a laptop.

FIG. 1 is a schematic diagram of a conventional lamp for a laptop. Referring to FIG. 1, the conventional lamp for the laptop is roughly divided into a lamp body 1 and a lamp arm 2, and the lamp body 1 and the lamp arm 2 are rotatably assembled together by means of magnetic attraction.

As shown in FIG. 1, an electrical contact portion 3 is disposed at the lamp arm 2, and the lamp body 1 may use a metal convex point (not shown), such as a metal dome, to contact the electrical contact portion 3 of the lamp arm 2 for electrical connection.

However, if a user rotates the lamp body 1 of the lamp for the laptop according to the usage requirements to change the illumination angle of the lamp for the laptop, the metal convex point of the lamp body 1 will repeatedly rub against the electrical contact portion 3 of the lamp arm 2 and cause wear and tear of the electrical contact portion 3.

SUMMARY

The disclosure provides a novel-structured lamp for a laptop, which can improve the problem of wear and tear of the electrical contact caused by rotating the lamp body to adjust the illumination angle.

A lamp for a laptop of the disclosure includes a lamp arm, a base, and a lamp body. The lamp arm has a connecting element and a first electrical contact, and the first electrical contact is located at the connecting element. The base has a first rotating shaft portion, and the first rotating shaft portion is fixedly connected to the connecting element. The lamp body includes a casing, a circuit board, a second electrical contact, and a flexible circuit board. The casing has a second rotating shaft portion, and the second rotating shaft portion overlaps with the first rotating shaft portion and is adapted to rotate relative to the first rotating shaft portion. The circuit board is disposed in the casing relatively away from the first rotating shaft portion, and the second electrical contact passes through the first rotating shaft portion and is configured to contact the first electrical contact. The flexible circuit board is electrically connected between the circuit board and the second electrical contact. When the lamp body is rotated relative to the base by the first rotating shaft portion and the second rotating shaft portion, the relative position of the second electrical contact and the first electrical contact is fixed.

In an embodiment of the disclosure, the above-mentioned lamp body further includes a first magnetic element, which is disposed on the lamp body relatively close to the first rotating shaft portion. The base is provided with a second magnetic element, and the first magnetic element and the second magnetic element attract each other.

In an embodiment of the disclosure, the above-mentioned connecting element has an arched portion, and the arched portion has an opening and an accommodation groove. The first electrical contact is disposed in the opening, and the second magnetic element is disposed in the accommodation groove.

In an embodiment of the disclosure, the above-mentioned base has a bottom, and the first rotating shaft portion protrudes from the bottom. The first rotating shaft portion has an empty groove, and the first magnetic element is disposed corresponding to the empty groove.

In an embodiment of the disclosure, the above-mentioned lamp for the laptop further includes a buffer element disposed between the first magnetic element and the first rotating shaft portion.

In an embodiment of the disclosure, the above-mentioned flexible circuit board is disposed and bent between the circuit board and the first rotating shaft portion.

In an embodiment of the disclosure, the above-mentioned flexible circuit board is welded to the second electrical contact.

In an embodiment of the disclosure, the above-mentioned lamp for the laptop further includes a battery arm. The lamp arm is located between the lamp body and the battery arm, the battery arm is adapted to accommodate a battery, and the battery is electrically connected to the first electrical contact.

In an embodiment of the disclosure, the above-mentioned second electrical contact is a pogo pin.

In an embodiment of the disclosure, when the lamp body rotates relative to the base, the flexible circuit board deforms to maintain the electrical connection between the second electrical contact and the first electrical contact.

Based on the above, the lamp for the laptop of the disclosure provides a novel structure, so that when the lamp body rotates relative to the base, the relative position of the electrical contacts is fixed, so as to improve the problem of wear and tear of the electrical contact of the conventional lamp for the laptop due to the rotation of the lamp body to adjust the illumination angle.

DESCRIPTION OF THE EMBODIMENTS

Figure 2:
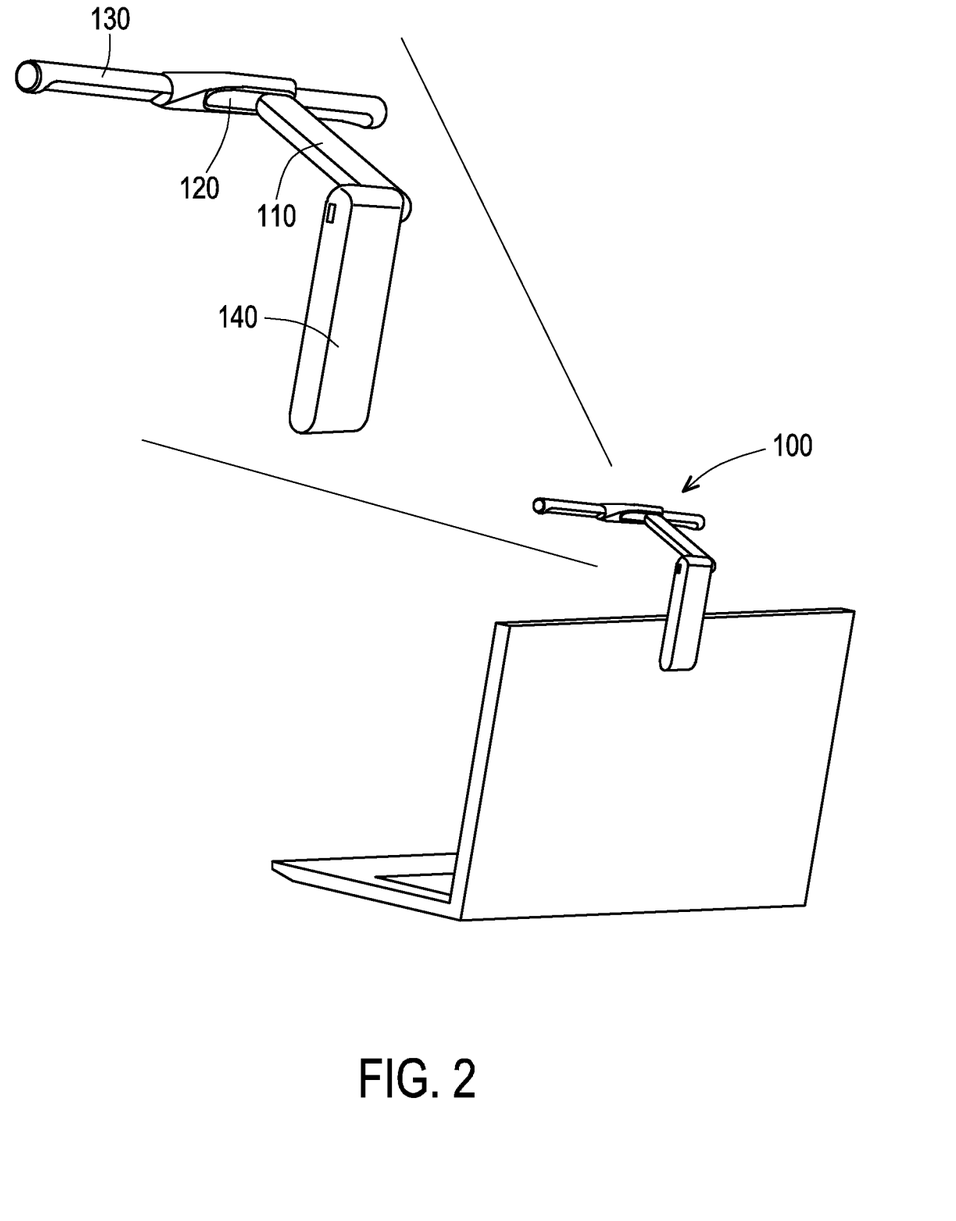
FIG. 2 is a schematic diagram of a lamp for a laptop placed on a laptop according to an embodiment of the disclosure.

FIG. 2 is a schematic diagram of a lamp for a laptop placed on a laptop according to an embodiment of the disclosure. Referring to FIG. 2, the lamp 100 for the laptop of the embodiment is adapted to be installed on a notebook computer (not shown) to provide sufficient brightness for a user of the notebook computer. The lamp 100 for the laptop includes a lamp arm 110, a base 120, a lamp body 130, and a battery arm 140. The lamp body 130 may be rotatably assembled on the base 120, and the base 120 is connected to the lamp arm 110. Thus, the lamp arm 110 is located between the lamp body 130 and the battery arm 140. The battery arm 140 is configured to accommodate a battery (not shown), and the battery is electrically connected to a first electrical contact 114 (shown in FIG. 5) disposed on the lamp arm 110. When the lamp body 130 is assembled on the base 120, a second electrical contact 133 (shown in FIG. 5) of the lamp body 130 makes physical contact with the first electrical contact 114 (shown in FIG. 5) for electrical connection, so that the battery (not shown) can supply power to a light source disposed in the lamp body 130. The user may rotate the lamp body 130 relative to the base 120 to adjust the illumination angle of the lamp 100 for the laptop.

Figure 3:
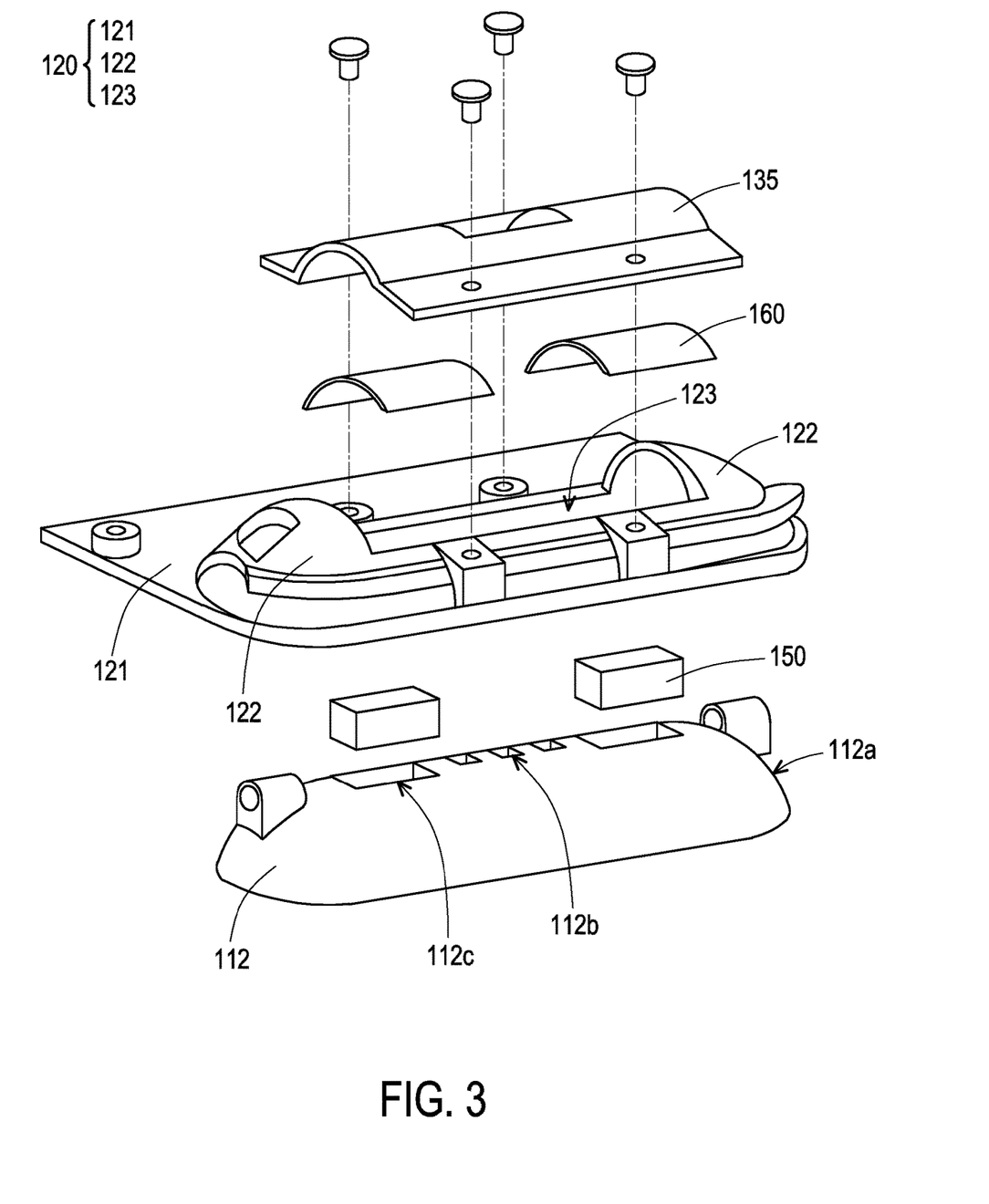
FIG. 3 is an exploded schematic diagram of the lamp arm, the lamp body, and the base of the lamp for the laptop of FIG. 2.
Figure 4:
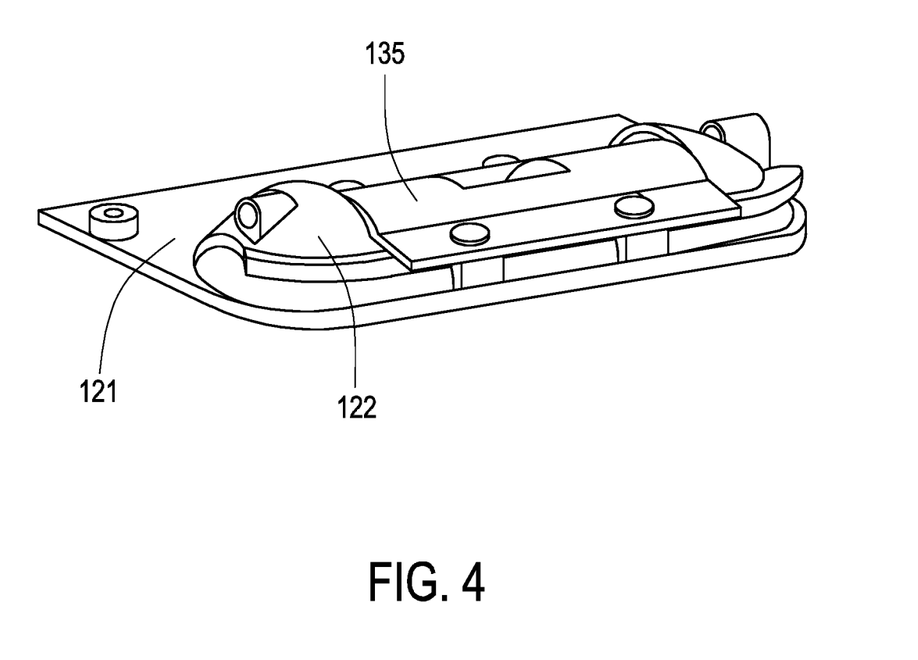
FIG. 4 is a combined schematic diagram of the lamp arm, the lamp body, and the base of FIG. 3.
Figure 5:
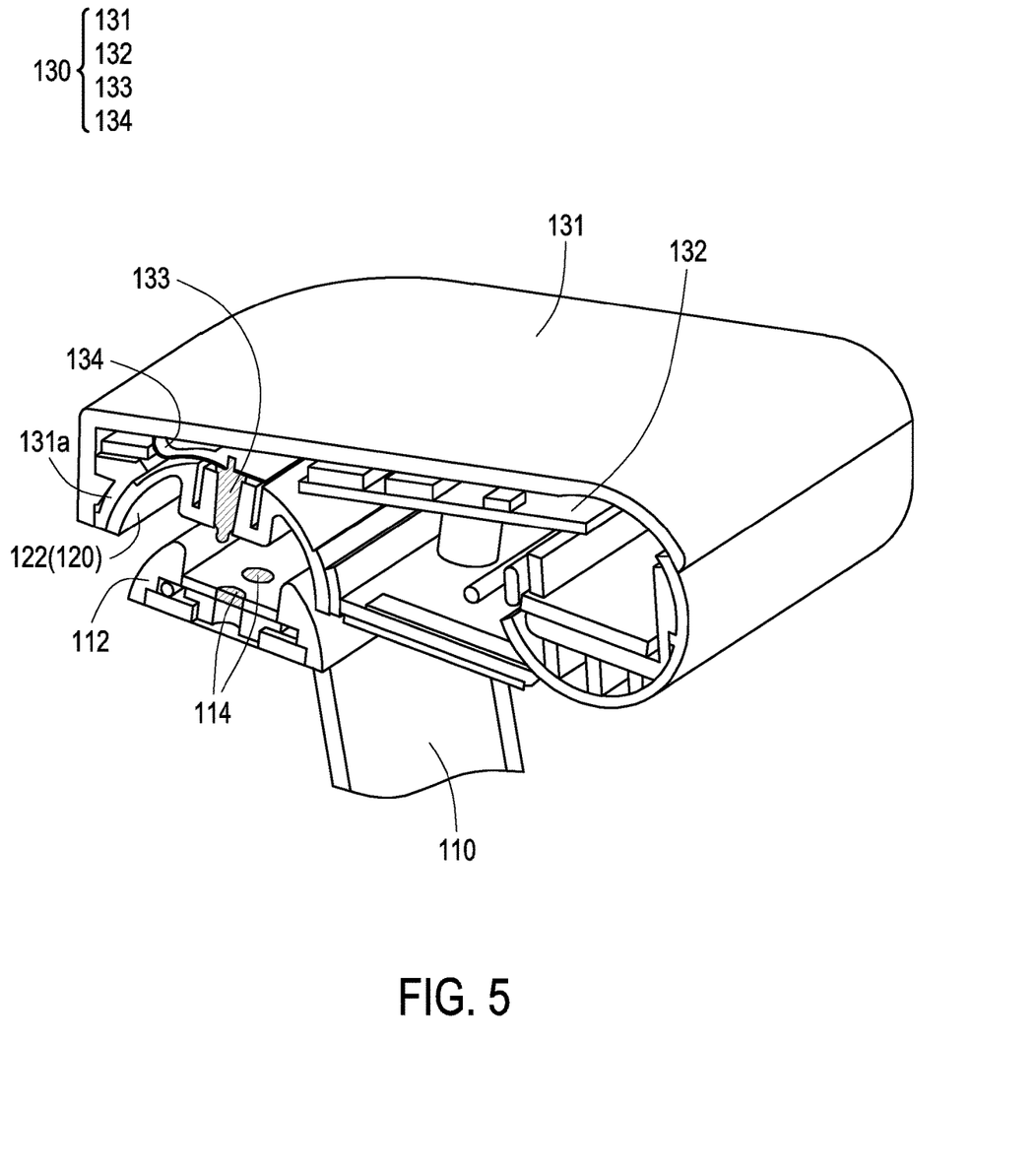
FIG. 5 is a schematic partial cross-sectional view of the lamp for the laptop of FIG. 2.

FIG. 3 is an exploded schematic diagram of the lamp arm, the lamp body, and the base of the lamp for the laptop of FIG. 2, FIG. 4 is a combined schematic diagram of the lamp arm, the lamp body, and the base of FIG. 3, and FIG. 5 is a partial cross-sectional schematic diagram of the lamp for the laptop of FIG. 2. Please refer to FIGS. 3, 4, and 5 at the same time. The above-mentioned lamp arm 110 has a connecting element 112 and the first electrical contact 114, and the first electrical contact 114 is disposed at the connecting element 112. The base 120 has a first rotating shaft portion 122, and the first rotating shaft portion 122 is fixedly connected to the connecting element 112. The fixed connection referred to here means that the first rotating shaft portion 122 is fixed on the connecting element 112, and thus the base 120 and the lamp arm 110 do not move or rotate relative to each other.

Specifically, the connecting element 112 has an arched portion 112a, the arched portion 112a has an opening 112b, and the first electrical contact 114 is disposed in the opening 112b.

The base 120 has a bottom 121, and the first rotating shaft portion 122 is arc-shaped protruding from the bottom 121 and conforming to the arched portion 112a. In the embodiment, a pair of first rotating shaft portions 122 are provided and located on opposite sides of the surface of the base 120 facing the lamp body 130, and the first rotating shaft portions 122 are stacked on the arched portion 112a of the connecting element 112.

The lamp body 130 includes a casing 131, a circuit board 132, a second electrical contact 133, and a flexible circuit board 134. The casing 131 has a second rotating shaft portion 131a overlapping with the first rotating shaft portion 122 and adapted to rotate relative to the first rotating shaft portion 122, and the shapes of the second rotating shaft portion 131a and the first rotating shaft portion 122 match each other. The circuit board 132 is disposed in the casing 131 relatively away from the first rotating shaft portion 122. In the embodiment, the second electrical contact 133 is a pogo pin, and the second electrical contact 133 passes through the first rotating shaft portion 122 and is configured to contact the first electrical contact 114.

It should be noted that for example, the second electrical contact 133 of a pogo pin passes through the first rotating shaft portion 122 to contact the first electrical contact 114 in a positive direction, and since the first rotating shaft portion 122 is fixedly connected to the connecting element 112 and does not move or rotate relative to the connecting element 112, the second electrical contact 133 always keeps in contact with the first electrical contact 114.

The above-mentioned flexible circuit board 134 is electrically connected between the circuit board 132 and the second electrical contact 133, and the flexible circuit board 134 is connected to the second electrical contact 133 by welding. The flexible circuit board 134 is disposed in the space between the casing 131 and the base 120, and a part of the flexible circuit board 134 is flexibly bent between the circuit board 132 and the first rotating shaft portion 122.

Assembling the lamp body 130 and the base 120 may have many ways, which may be determined according to actual needs. In the embodiment, the lamp body 130 and the base 120 are simply assembled together by means of magnetic attraction. Specifically, the lamp body 130 further includes a first magnetic element 135 disposed on the lamp body 130 relatively close to the first rotating shaft portion 122. The connecting element 112 further has an accommodation groove 112c, a second magnetic element 150 is disposed in the accommodation groove 112c, and the lamp body 130 is assembled to the base 120 through the mutual attraction of the first magnetic element 135 and the second magnetic element 150.

In detail, an empty groove 123 exists between the two first rotating shaft portions 122, and the first magnetic element 135 is disposed corresponding to the empty groove 123. In the embodiment, the first magnetic element 135 is selected from a metal sheet that can be affected by magnetism, such as an iron sheet, and the shape of the first magnetic element 135 may be made into an arch similar to the shapes of the first rotating shaft portion 122 and the second rotating shaft portion 131a, so as to adapt to the shapes of the first rotating shaft portion 122 and the second rotating shaft portion 131a. The second magnetic element 150 disposed in the accommodation groove 112c may be a magnet.

Figure 6:
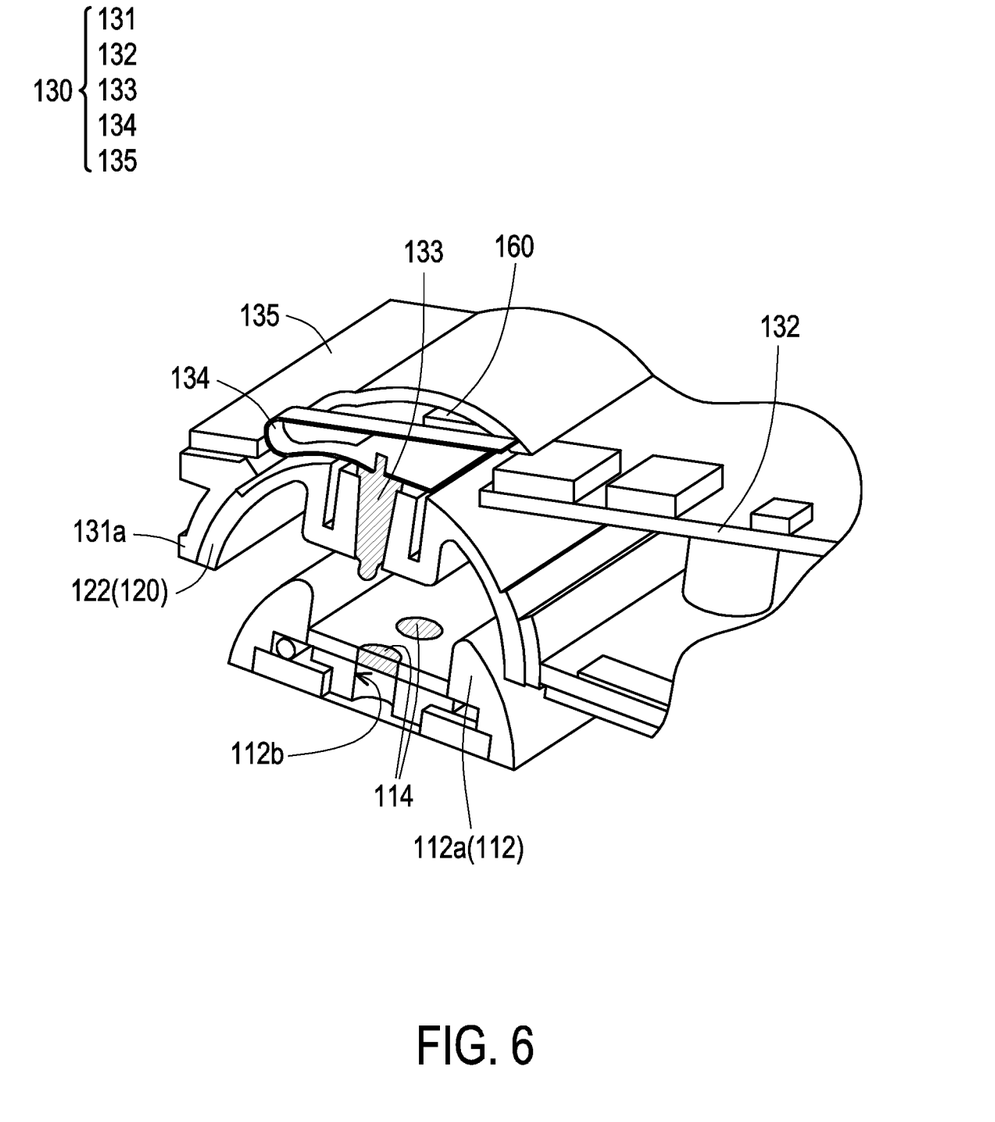
FIG. 6 is a schematic cross-sectional view of the lamp for the laptop of FIG. 2.

FIG. 6 is a schematic cross-sectional view of the lamp for the laptop of FIG. 2. Referring to FIG. 6, the lamp 100 for the laptop further includes a buffer element 160 disposed between the first magnetic element 135 and the first rotating shaft portion 122. The buffer element 160 is configured to buffer wear and tear that may be caused by the direct contact between the first magnetic element 135, the first rotating shaft portion 122, and/or the connecting portion when the first rotating shaft portion 122 and the second rotating shaft portion 131a rotate relative to each other.

It should be noted that the cross-sectional positions of FIG. 5 and FIG. 6 are different, and in order to clearly show the configuration position of the buffer element 160, the casing 131 is omitted in FIG. 6.

Figure 7A:
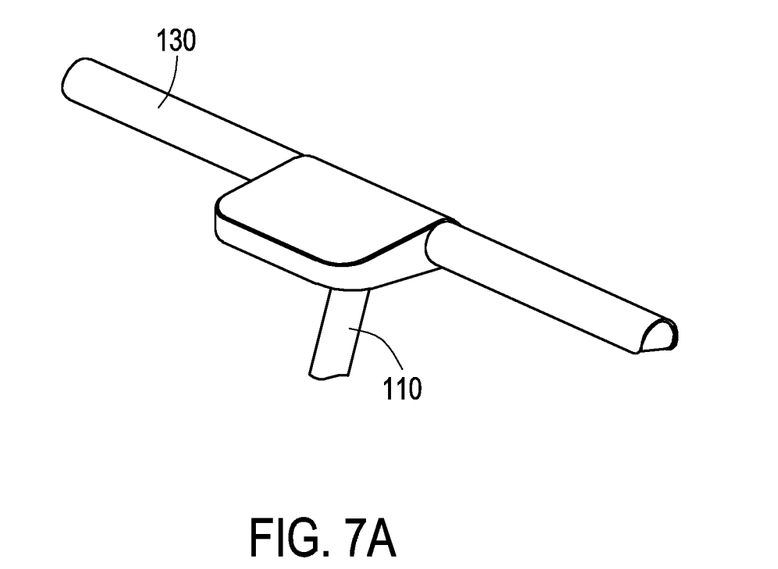
FIG. 7A is a schematic diagram of a lamp for a laptop at a first illumination angle.
Figure 7B:
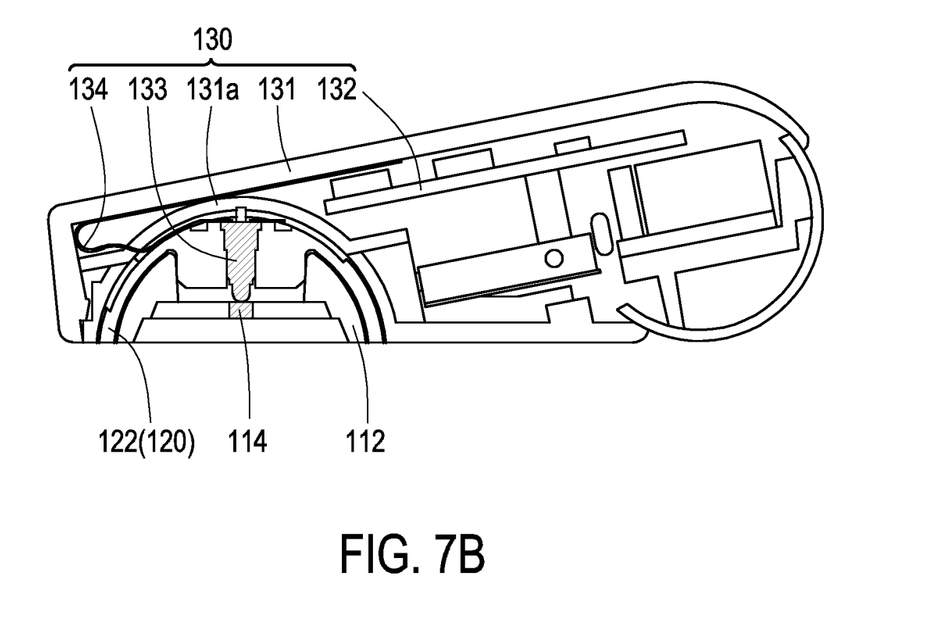
FIG. 7B is a partial cross-sectional view of FIG. 7A.

FIG. 7A is a schematic diagram of a lamp for a laptop at a first illumination angle, and FIG. 7B is a partial cross-sectional view of FIG. 7A. Please refer to FIGS. 7A and 7B at the same time. Through the above-mentioned configuration structure, a part of the flexible circuit board 134 is flexibly bent between the circuit board 132 and the first rotating shaft portion 122, and the second electrical contact 133 of the pogo pin contacts the first electrical contact 114 in a positive direction. It should be noted that the part of the flexible circuit board 134 that is bent between the circuit board 132 and the first rotating shaft portion 122 is not stretched, but is bent between the circuit board 132 and the first rotating shaft portion 122 with a margin of deformation.

Figure 8A:
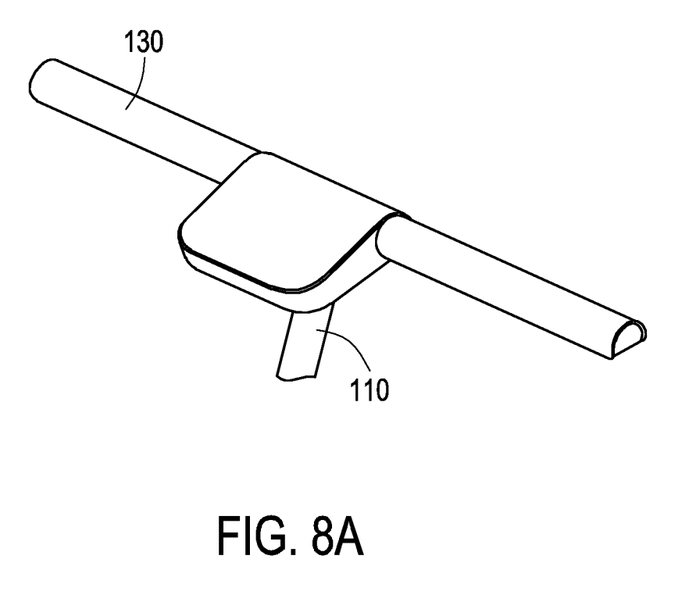
FIG. 8A is a schematic diagram of a lamp for a laptop at a second illumination angle.
Figure 8B:
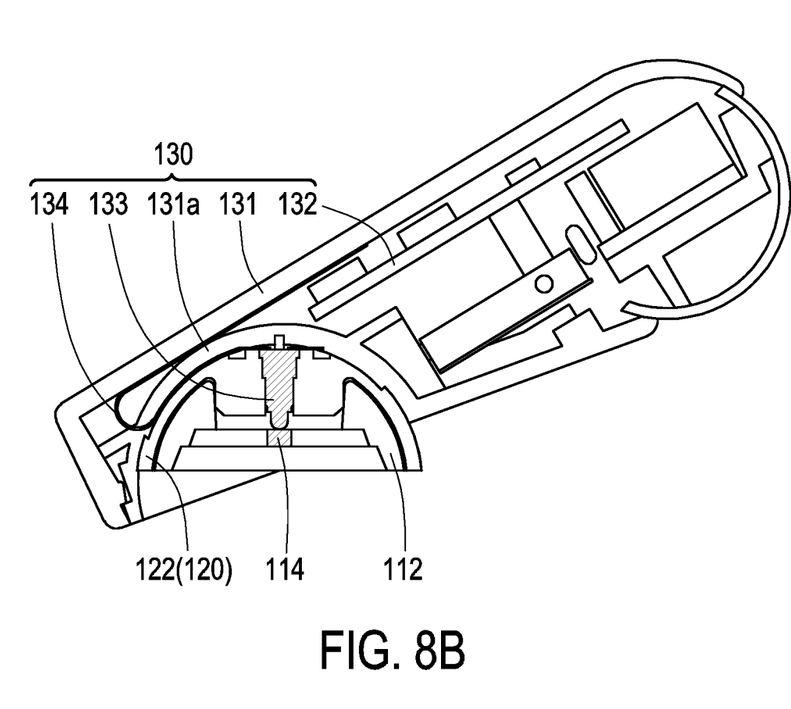
FIG. 8B is a partial cross-sectional view of FIG. 8A.

FIG. 8A is a schematic diagram of a lamp for a laptop at a second illumination angle, and FIG. 8B is a partial cross-sectional view of FIG. 8A. Please refer to FIGS. 7B, 8A, and 8B at the same time. When the user rotates the lamp body 130 to make the lamp body 130 rotate relative to the base 120 to change the illumination angle, the second rotating shaft portion 131a of the casing 131 of the lamp body 130 rotates relative to the first rotating shaft portion 122 of the base 120. The flexible circuit board 134 connected between the circuit board 132 disposed in the casing 131 and the second electrical contact 133 is pulled by the circuit board 132 due to the rotation of the casing 131 so that the part with a margin of deformation is deformed, and the electrical connection between the circuit board 132 and the second electrical contact 133 is always maintained through the flexible circuit board 134.

Based on the above, since the second electrical contact 133 is not disposed at the second rotating shaft portion 131a, but is disposed passing through the first rotating shaft portion 122 and contacts the first electrical contact 114 in a positive direction. Therefore, when the second rotating shaft portion 131a rotates relative to the first rotating shaft portion 122, the second electrical contact 133 does not change the position due to the rotation of the second rotating shaft portion 131a, and always keeps in contact with the first electrical contact 114 in a positive direction.

In addition, since the first rotating shaft portion 122 is fixed on the connecting element 112, the base 120 does not move or rotate relative to the lamp arm 110, and the relative position between the second electrical contact 133 and the first electrical contact 114 is not affected, that is, the relative position of the second electrical contact 133 and the first electrical contact 114 is fixed, and the second electrical contact 133 always keeps in contact with the first electrical contact 114 in a positive direction.

To sum up, the lamp for the laptop of the disclosure changes the configuration structure to be different from the configuration structure of the conventional lamp for the laptop. Therefore, when the lamp body rotates relative to the base, the relative position of the two electrical contacts is fixed and the two electrical contacts always keep in contact in a positive direction, thereby improving the problem of wear and tear of the electrical contact of the conventional lamp for the laptop due to the rotation of the lamp body to adjust the illumination angle.

What is claimed is:

1. A lamp for a laptop, comprising:
    a lamp arm, having a connecting element and a first electrical contact, wherein the first electrical contact is located at the connecting element;
    a base, having a first rotating shaft portion, and the first rotating shaft portion being fixedly connected to the connecting element; and
    a lamp body, comprising a casing, a circuit board, a second electrical contact, and a flexible circuit board, the casing having a second rotating shaft portion, the second rotating shaft portion overlapping with the first rotating shaft portion and being adapted to rotate relative to the first rotating shaft portion, the circuit board being disposed in the casing relatively away from the first rotating shaft portion, the second electrical contact passing through the first rotating shaft portion and being configured to contact the first electrical contact, and the flexible circuit board being electrically connected between the circuit board and the second electrical contact,
    wherein when the lamp body is rotated relative to the base by the first rotating shaft portion and the second rotating shaft portion, a relative position of the second electrical contact and the first electrical contact is fixed.

2. The lamp for the laptop according to claim 1, wherein the lamp body further comprises a first magnetic element, which is disposed on the lamp body relatively close to the first rotating shaft portion, the base is provided with a second magnetic element, and the first magnetic element and the second magnetic element attract each other.

3. The lamp for the laptop according to claim 2, wherein the connecting element has an arched portion, the arched portion has an opening and an accommodation groove, the first electrical contact is disposed in the opening, and the second magnetic element is disposed in the accommodation groove.

4. The lamp for the laptop according to claim 3, wherein the base has a bottom, the first rotating shaft portion protrudes from the bottom, the first rotating shaft portion has an empty groove, and the first magnetic element is disposed corresponding to the empty groove.

5. The lamp for the laptop according to claim 4, further comprising a buffer element, disposed between the first magnetic element and the first rotating shaft portion.

6. The lamp for the laptop according to claim 1, wherein the flexible circuit board is disposed and bent between the circuit board and the first rotating shaft portion.

7. The lamp for the laptop according to claim 1, wherein the flexible circuit board is welded to the second electrical contact.

8. The lamp for the laptop according to claim 1, further comprising a battery arm, wherein the lamp arm is located between the lamp body and the battery arm, the battery arm is adapted to accommodate a battery, and the battery is electrically connected to the first electrical contact.

9. The lamp for the laptop according to claim 1, wherein the second electrical contact is a pogo pin.

10. The lamp for the laptop according to claim 1, wherein when the lamp body rotates relative to the base, the flexible circuit board deforms to maintain the electrical connection between the second electrical contact and the first electrical contact.

* * * * *